US009882902B2

(12) United States Patent
Chastain et al.

(10) Patent No.: US 9,882,902 B2
(45) Date of Patent: *Jan. 30, 2018

(54) APPARATUS AND METHOD FOR SECURE PROVISIONING OF A COMMUNICATION DEVICE

(71) Applicant: AT&T INTELLECTUAL PROPERTY I, LP, Atlanta, GA (US)

(72) Inventors: Walter Cooper Chastain, Atlanta, GA (US); Stephen Emille Chin, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,441

(22) Filed: Feb. 29, 2016

(65) Prior Publication Data

US 2016/0182512 A1 Jun. 23, 2016

Related U.S. Application Data

(63) Continuation of application No. 14/070,458, filed on Nov. 1, 2013, now Pat. No. 9,313,660.

(51) Int. Cl.
*H04L 29/00* (2006.01)
*H04L 29/06* (2006.01)
(Continued)

(52) U.S. Cl.
CPC ........ *H04L 63/0876* (2013.01); *H04L 63/061* (2013.01); *H04L 63/123* (2013.01);
(Continued)

(58) Field of Classification Search
CPC ...... H04L 63/20; H04L 63/04; H04L 2209/24
See application file for complete search history.

(56) References Cited

U.S. PATENT DOCUMENTS 5,742,910 A 4/1998 Gallant et al.
5,774,544 A 6/1998 Lee et al.
(Continued)

FOREIGN PATENT DOCUMENTS

AU 2010315111 A1 6/2012
CA 2823685 A1 2/2012
(Continued)

OTHER PUBLICATIONS

"Over-The-Air Platform Security Review", Mandiant Intelligent Information Security, 6 pgs., Aug. 17, 2010.
(Continued)

*Primary Examiner* — Ghazal Shehni
(74) *Attorney, Agent, or Firm* — Guntin & Gust, PLC; Ralph Trementozzi

(57) ABSTRACT

A system that incorporates the subject disclosure may perform, for example, receiving an over-the-air programming message that includes programming data for use by the mobile communication device, decrypting the over-the-air programming message utilizing a first keyset to generate a decrypted over-the-air programming message, determining a schedule for providing messages from a secure device processor to a secure element of the mobile communication device where the secure device processor is separate from the secure element and in communication with the secure element, and providing the decrypted over-the-air programming message to the secure element according to the schedule. Other embodiments are disclosed.

17 Claims, 9 Drawing Sheets

(51) Int. Cl.
*H04W 12/06* (2009.01)
*H04W 4/00* (2009.01)
*H04W 8/20* (2009.01)
*H04W 12/02* (2009.01)

(52) U.S. Cl.
CPC ............ *H04W 4/001* (2013.01); *H04W 8/20* (2013.01); *H04W 12/02* (2013.01); *H04W 12/06* (2013.01)

(56) References Cited

U.S. PATENT DOCUMENTS

| | | |
|---|---|---|
| 6,005,942 A | 12/1999 | Chan et al. |
| 6,014,561 A | 1/2000 | Moelne |
| 6,151,677 A | 11/2000 | Walter et al. |
| 6,892,301 B1 | 5/2005 | Hansmann et al. |
| 6,922,200 B1 | 7/2005 | Marques et al. |
| 7,165,173 B1 | 1/2007 | Herle |
| 7,185,362 B2 * | 2/2007 | Hawkes ............... G06F 21/10 380/201 |
| 7,239,704 B1 | 7/2007 | Maillard et al. |
| 7,257,844 B2 | 8/2007 | Woodward et al. |
| 7,269,732 B2 | 9/2007 | Kilian-Kehr |
| 7,382,881 B2 | 6/2008 | Uusitalo et al. |
| 7,454,233 B2 | 11/2008 | Lu et al. |
| 7,472,123 B2 | 12/2008 | Hamatsu |
| 7,480,907 B1 | 1/2009 | Marolia et al. |
| 7,499,960 B2 | 3/2009 | Dageville et al. |
| 7,606,560 B2 | 10/2009 | Labrou et al. |
| 7,715,823 B2 | 5/2010 | Bravo et al. |
| 7,751,567 B2 | 7/2010 | Quick, Jr. et al. |
| 7,917,751 B2 | 3/2011 | Keohane et al. |
| 8,027,472 B2 | 9/2011 | Aissi et al. |
| 8,032,756 B2 | 10/2011 | Inami |
| 8,055,910 B2 | 11/2011 | Kocher et al. |
| 8,064,598 B2 | 11/2011 | Vaha-Sipila et al. |
| 8,098,818 B2 | 1/2012 | Grilli et al. |
| 8,165,635 B2 | 4/2012 | Khan et al. |
| 8,166,524 B2 | 4/2012 | Sentinelli |
| 8,213,612 B2 | 7/2012 | Kaabouch et al. |
| 8,244,181 B2 | 8/2012 | Shuo |
| 8,271,025 B2 | 9/2012 | Brisebois et al. |
| 8,333,321 B2 | 12/2012 | Gressel et al. |
| 8,346,287 B2 | 1/2013 | King et al. |
| 8,380,171 B2 | 2/2013 | Link et al. |
| 8,387,119 B2 | 2/2013 | Patel et al. |
| 8,391,837 B2 | 3/2013 | Corda |
| 8,406,758 B2 | 3/2013 | Snijder et al. |
| 8,417,952 B2 | 4/2013 | Cheng et al. |
| 8,494,908 B2 | 7/2013 | Herwig et al. |
| 8,503,376 B2 | 8/2013 | Cha et al. |
| 8,505,085 B2 | 8/2013 | Logan et al. |
| 8,510,559 B2 | 8/2013 | Guccione et al. |
| 8,533,803 B2 | 9/2013 | Cha et al. |
| 8,738,898 B2 | 5/2014 | Herwono et al. |
| 8,776,189 B2 | 7/2014 | Jain |
| 8,799,932 B2 | 8/2014 | Prevost |
| 8,814,051 B2 | 8/2014 | Millet et al. |
| 8,837,449 B2 | 9/2014 | Chen et al. |
| 9,301,145 B2 | 3/2016 | Merrien et al. |
| 2001/0029581 A1 | 10/2001 | Knauft |
| 2002/0003892 A1 | 1/2002 | Iwanaga |
| 2002/0040936 A1 | 4/2002 | Wentker et al. |
| 2003/0129965 A1 | 7/2003 | Siegel |
| 2003/0186722 A1 | 10/2003 | Weiner |
| 2004/0240671 A1 | 12/2004 | Hu et al. |
| 2005/0002407 A1 | 1/2005 | Shaheen et al. |
| 2005/0202803 A1 | 9/2005 | Mahalal |
| 2005/0278787 A1 | 12/2005 | Naslund et al. |
| 2006/0079284 A1 | 4/2006 | Lu et al. |
| 2006/0130128 A1 | 6/2006 | Gorancic et al. |
| 2006/0165060 A1 | 7/2006 | Dua |
| 2006/0205387 A1 | 9/2006 | Laitinen et al. |
| 2006/0206710 A1 | 9/2006 | Gehrmann |
| 2006/0242064 A1 | 10/2006 | Jogand-Coulomb et al. |
| 2006/0269061 A1 | 11/2006 | Balasubramanian et al. |
| 2006/0289659 A1 | 12/2006 | Mizushima et al. |
| 2007/0050365 A1 | 3/2007 | Laitinen et al. |
| 2007/0101122 A1 | 5/2007 | Guo |
| 2007/0239857 A1 | 10/2007 | Mahalal et al. |
| 2007/0294744 A1 | 12/2007 | Alessio et al. |
| 2008/0005559 A1 | 1/2008 | Johnson |
| 2008/0010470 A1 | 1/2008 | McKeon et al. |
| 2008/0155257 A1 | 6/2008 | Werner et al. |
| 2008/0301433 A1 | 12/2008 | Vito |
| 2008/0304458 A1 | 12/2008 | Aghvami et al. |
| 2009/0077643 A1 | 3/2009 | Schmidt et al. |
| 2009/0116642 A1 | 5/2009 | Yang |
| 2009/0163235 A1 | 6/2009 | Michaels et al. |
| 2009/0191857 A1 | 7/2009 | Horn et al. |
| 2009/0220091 A1 | 9/2009 | Howard |
| 2009/0288012 A1 | 11/2009 | Hertel et al. |
| 2009/0327138 A1 | 12/2009 | Mardani et al. |
| 2010/0037230 A1 | 2/2010 | Potonniee et al. |
| 2010/0048169 A1 | 2/2010 | Yan et al. |
| 2010/0062808 A1 | 3/2010 | Cha et al. |
| 2010/0281251 A1 | 11/2010 | Arauz Rosado |
| 2010/0299731 A1 | 11/2010 | Atkinson |
| 2010/0306531 A1 | 12/2010 | Nahari |
| 2010/0315346 A1 | 12/2010 | Lindroos et al. |
| 2011/0007899 A1 | 1/2011 | Park et al. |
| 2011/0035584 A1 | 2/2011 | Meyerstein et al. |
| 2011/0191597 A1 | 8/2011 | Grall |
| 2011/0208600 A1 | 8/2011 | Aharoni et al. |
| 2011/0211699 A1 | 9/2011 | Ma et al. |
| 2011/0265159 A1 | 10/2011 | Ronda et al. |
| 2011/0269423 A1 | 11/2011 | Schell et al. |
| 2011/0296182 A1 | 12/2011 | Jia et al. |
| 2011/0302017 A1 | 12/2011 | Marti et al. |
| 2011/0302408 A1 | 12/2011 | McDermott et al. |
| 2012/0027209 A1 | 2/2012 | Aissi et al. |
| 2012/0028609 A1 | 2/2012 | Hruska |
| 2012/0036042 A1 | 2/2012 | Graylin et al. |
| 2012/0047563 A1 | 2/2012 | Wheeler |
| 2012/0066504 A1 | 3/2012 | Hird et al. |
| 2012/0072979 A1 | 3/2012 | Cha et al. |
| 2012/0096513 A1 | 4/2012 | Raleigh et al. |
| 2012/0102557 A1 | 4/2012 | Felton |
| 2012/0108205 A1 | 5/2012 | Schell et al. |
| 2012/0108213 A1 | 5/2012 | Kasargod et al. |
| 2012/0130838 A1 | 5/2012 | Koh et al. |
| 2012/0142332 A1 | 6/2012 | Li |
| 2012/0144201 A1 | 6/2012 | Anantha et al. |
| 2012/0159163 A1 | 6/2012 | von Behren et al. |
| 2012/0172089 A1 | 7/2012 | Bae et al. |
| 2012/0185661 A1 | 7/2012 | Desai et al. |
| 2012/0187184 A1 | 7/2012 | Challa et al. |
| 2012/0190354 A1 | 7/2012 | Merrien et al. |
| 2012/0208597 A1 | 8/2012 | Billman |
| 2012/0231844 A1 | 9/2012 | Coppinger |
| 2012/0233685 A1 | 9/2012 | Palanigounder et al. |
| 2012/0246476 A1 | 9/2012 | Zhuang et al. |
| 2012/0259849 A1 | 10/2012 | Deodhar et al. |
| 2012/0266220 A1 | 10/2012 | Brudnicki et al. |
| 2012/0311563 A1 | 12/2012 | Lee et al. |
| 2012/0317261 A1 | 12/2012 | Ahmavaara et al. |
| 2013/0012168 A1 | 1/2013 | Rajadurai et al. |
| 2013/0023235 A1 | 1/2013 | Fan et al. |
| 2013/0024383 A1 * | 1/2013 | Kannappan ............ G06Q 20/40 705/71 |
| 2013/0041830 A1 | 2/2013 | Singh et al. |
| 2013/0067232 A1 | 3/2013 | Cheung et al. |
| 2013/0074163 A1 | 3/2013 | Murakami et al. |
| 2013/0145455 A1 | 6/2013 | Vijayshankar et al. |
| 2013/0152208 A1 | 6/2013 | King et al. |
| 2013/0166595 A1 | 6/2013 | Meketa et al. |
| 2013/0173759 A1 * | 7/2013 | Herse .................. G06F 21/34 709/219 |
| 2013/0203465 A1 | 8/2013 | Ali et al. |
| 2013/0262317 A1 | 10/2013 | Collinge et al. |
| 2013/0272714 A1 | 10/2013 | Ohkubo |
| 2013/0291084 A1 | 10/2013 | Amiel et al. |
| 2013/0329683 A1 | 12/2013 | Gachon et al. |
| 2013/0344857 A1 | 12/2013 | Berionne et al. |

(56) References Cited

U.S. PATENT DOCUMENTS

| | | |
|---|---|---|
| 2014/0013406 A1 | 1/2014 | Tremlet |
| 2014/0018041 A1 | 1/2014 | Summerer et al. |
| 2014/0045462 A1 | 2/2014 | Warnez |
| 2014/0057680 A1 | 2/2014 | Proust et al. |
| 2014/0066019 A1 | 3/2014 | Waters et al. |
| 2014/0073375 A1 | 3/2014 | Li et al. |
| 2014/0189880 A1 | 7/2014 | Funk |
| 2014/0215589 A1 | 7/2014 | Dietrich et al. |
| 2014/0243022 A1 | 8/2014 | L'Heriteau et al. |
| 2014/0281498 A1 | 9/2014 | Bransom et al. |
| 2014/0317686 A1 | 10/2014 | Vetillard |
| 2014/0337234 A1 | 11/2014 | Brewer et al. |
| 2014/0373117 A1 | 12/2014 | Le Saint |
| 2015/0017910 A1 | 1/2015 | Li |
| 2015/0249658 A1 | 9/2015 | Lee et al. |
| 2016/0006762 A1 | 1/2016 | Dumoulin et al. |
| 2016/0323111 A1 | 11/2016 | Chastain et al. |
| 2016/0323255 A1 | 11/2016 | Chastain et al. |
| 2016/0381555 A1 | 12/2016 | Chastain |
| 2017/0118185 A1 | 4/2017 | Chastain et al. |
| 2017/0180366 A1 | 6/2017 | Chastain et al. |

FOREIGN PATENT DOCUMENTS

| | | |
|---|---|---|
| EP | 1257922 B1 | 6/2006 |
| EP | 1865437 A2 | 12/2007 |
| EP | 1480476 B1 | 10/2008 |
| EP | 2041913 A1 | 4/2009 |
| EP | 2113856 A1 | 11/2009 |
| EP | 2223252 A1 | 9/2010 |
| KR | 2013027097 | 3/2013 |
| WO | 2002063517 | 8/2002 |
| WO | 03046719 A2 | 6/2003 |
| WO | WO2003046719 | 6/2003 |
| WO | 2007079636 A1 | 7/2007 |
| WO | WO2007079636 | 7/2007 |
| WO | 2008059353 A1 | 5/2008 |
| WO | 2008149196 A1 | 12/2008 |
| WO | WO2009/046400 | 4/2009 |
| WO | WO2010051715 | 5/2010 |
| WO | WO2011/115407 | 9/2011 |
| WO | 2012110880 A1 | 8/2012 |
| WO | 2012151571 A2 | 11/2012 |
| WO | 2013006116 A2 | 1/2013 |
| WO | 2013/036009 | 3/2013 |
| WO | 2013/050296 | 11/2013 |

OTHER PUBLICATIONS

"The OTA Platform in the World of LTE", 14 pgs., Jan. 2011.
"3rd Generation Partnership Project; Technical Specification Group Core Network and Terminals; Characteristics of the Universal Subscriber Identity Module (USIM) application", Release 11, 2012.
"3rd Generation Partnership Project; Technical Specification Group Core Network and Terminals; Remote APDU Structure for (U)SIM Toolkit applications", Release 10, 2012.
"3rd Generation Partnership Project; Technical Specification Group Core Network and Terminals; Secured packet structure for (Universal) Subscriber Identity Module (U)SIM Toolkit applications", Release 10, 2012.
"3rd Generation Partnership Project; Technical Specification Group Core Network and Terminals; UICC-terminal interface; Physical and logical characteristics", Release 10, 2011.
"3rd Generation Partnership Project; Technical Specification Group Core Network and Terminals; Universal Subscriber Identity Module (USIM) Application Toolkit (USAT)", Release 11, 2012.
"GlobalPlatform Card Confidential Card Content Management Card Specification v2.2—Amendment A", 2011.
"GlobalPlatform Card Contactless Services Card Specification v2.2—Amendment C", 2012.
"GlobalPlatform Card Remote Application Management over HTTP Card Specification v2.2—Amendment B", 2012.
"GlobalPlatform Card Security Upgrade for Card Content Management Card Specification v 2.2—Amendment E", 2011.
"GlobalPlatform Card Specification", Version 2.2.1, 2011.
"GlobalPlatform Card Technology Secure Channel Protocol 03 Card Specification v 2.2—Amendment D", 2009.
"GlobalPlatform Device Secure Element Remote Application Management", May 2011.
"GlobalPlatform Device Technology Secure Element Access Control", Version 1.0, May 2012.
"GlobalPlatform Device Technology Tee System Architecture", Dec. 2011.
"GlobalPlatform Key Management System", Functional Requirements, Nov. 2003.
"GlobalPlatform System Messaging Specification for Management of Mobile-NFC Services", Feb. 2011.
"Reprogrammable SIMs: Technology, Evolution and Implications", csmg, Sep. 25, 2012.
"Smart Cards; Card Application Tookit (CAT)", Release 11, 2012.
"Smart Cards; ETSI numbering system for telecommunication application providers", Release 11, 2011.
"Smart Cards; Machine to Machine UICC; Physical and logical characteristics", Release 9, 2011.
"Smart Cards; Remote APDU structure for UICC based applications", Release 11, 2012.
"Smart Cards; Secured packet structure for UICC based applications", Release 11, 2012.
"Smart Cards; Security mechanisms for UICC based Applications—Functional requirements", Release 8, 2008.
"Smart Cards; UICC Application Programming Interface (UICC API) for Java Card™", Release 9, 2012.
"Smart Cards; UICC-Terminal Interface; Physical and logical characteristics", Release 10, 2011, 179 pages.
"Universal Mobile Telecommunications System (UMTS); UICC-terminal interface; Physical and logical characteristics", Release 10, 2011.
Chen, , "An efficient end-to-end security mechanism for IP multimedia subsystem", Computer Communications, 2008, vol. 31.18, pp. 4259-4268.
Dodson, Ben et al., "Snap2Pass: Consumer-Friendly Challenge—Response Authentication with a Phone", http://prpl.stanford.edu/papers/soups10j.pdf, Apr. 30, 2010.
Global Platform, , "Secure Element Remote Application Management", Version 1.0, May 2011.
Imhontu, et al., "A survey on near field communication in mobile phones & PDAs", Dissertation Halmstad University, 2010. http://hh.diva-portal.org/smash/get/diva2:385433/FULLTEXT01.
Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.
Kounelis, Ioannis et al., "Secure Middleware for Mobile Phones and UICC Applications", Mobile Wireless Middleware, Operating Systems, and Applications, Springer Berlin Heidelberg, 2012, 143-152.
Kounelis, Ioannis et al., "Security of service requests for cloud based m-commerce", MIPRO, 2012 Proceedings of the 35th International Convention, IEEE, 2012.
Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p. 214-225, Jun. 3-5, 2009.
Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.
Zhang, et al., "Cryptographic Key Agreement Protocol Simulation", Semantics Knowledge and Grid (SKG), 2010 Sixth International Conference on, 2010, pp. 418, 419.
"Secure Authentication for Mobile Internet Services", Sim Alliance, http://simalliance.org/wp-content/uploads/2015/03/12-01-01-WP_SIMallianceSecureAuthentication-EN-V1.1.pdf, Dec. 2011, 1-23

(56) References Cited

OTHER PUBLICATIONS

Farhat, Farshid et al., "Private Identification, Authentication and Key Agreement Protocol with Security Mode Setup", Iran Telecommunication Research Center, https://eprint.iacr.org/2011/045.pdf, Apr. 2011, 21 pages.
"Reprogrammable SIMs: Technology, Evolution and Implications Final Report", CSMG-Global, Sep. 25, 2012, 1-95.

\* cited by examiner

100

600

APPARATUS AND METHOD FOR SECURE PROVISIONING OF A COMMUNICATION DEVICE

CROSS-REFERENCE TO RELATED APPLICATIONS

This application is a Continuation of and claims priority to U.S. patent application Ser. No. 14/070,458 filed Nov. 1, 2013. The contents of each of the foregoing is/are hereby incorporated by reference into this application as if set forth herein in full.

FIELD OF THE DISCLOSURE

The subject disclosure relates to an apparatus and method for secure provisioning of a communication device.

BACKGROUND

Electronic devices are being utilized with more frequency to conduct various types of transactions and exchanges of information. The electronic devices can be provisioned with programming data, including an initial provisioning and subsequent provisioning(s). The provisioning can sometimes include receiving the programming data from a remote source.

BRIEF DESCRIPTION OF THE DRAWINGS

Reference will now be made to the accompanying drawings, which are not necessarily drawn to scale, and wherein.

DETAILED DESCRIPTION

Figure 1:
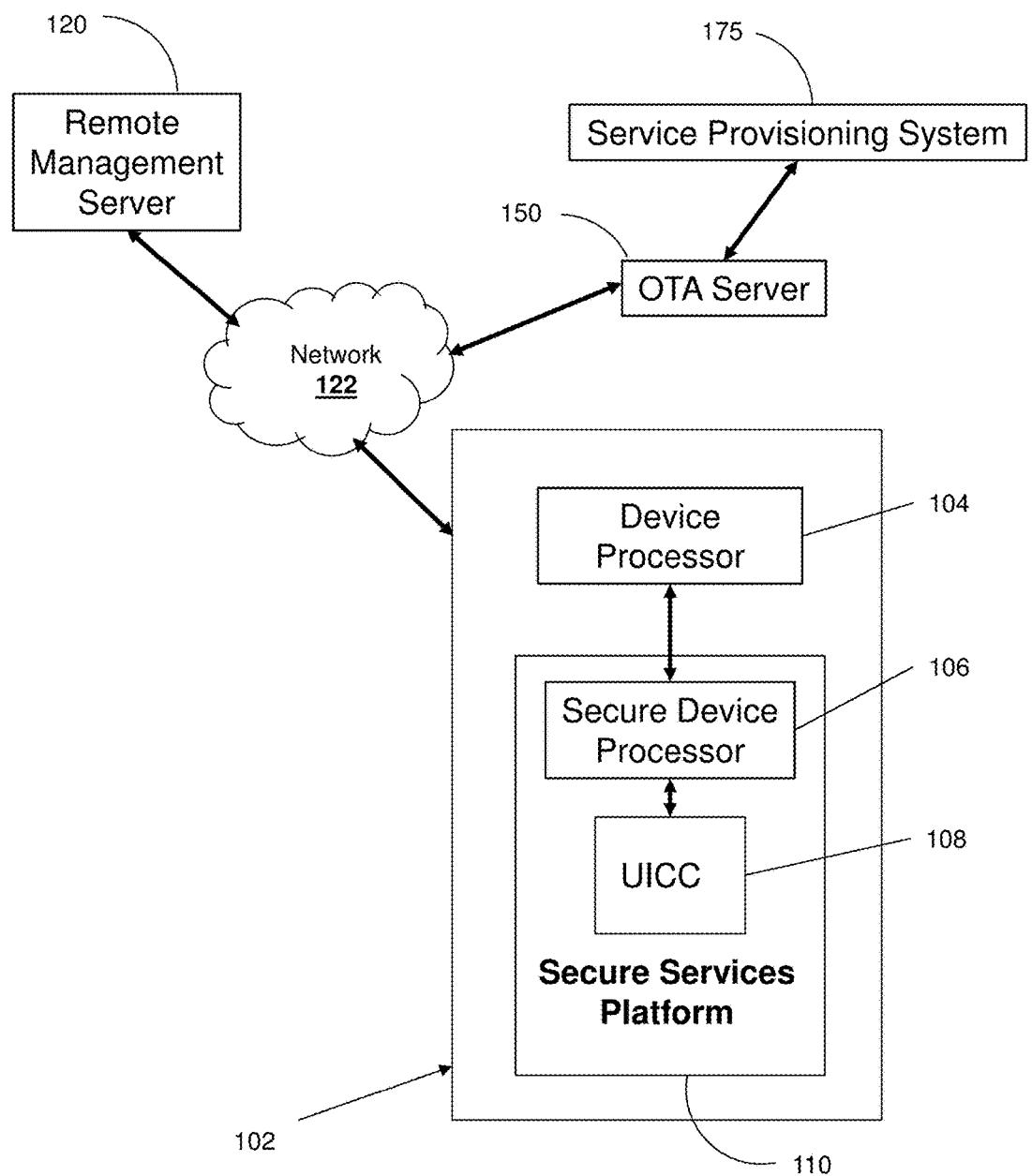
FIG. 1 depicts an illustrative embodiment of a system that enables use of a UICC and a secure device processor as part of a secure services platform for a securely provisioning a communication device.

The subject disclosure describes, among other things, illustrative embodiments in which provisioning can be performed for a communication device, such as via Over-The-Air programming (OTA) messages securely delivered to a communication device(s). The secure delivery can be performed utilizing authentication and/or encryption based on various keysets that are provided to various combinations of devices and/or components. In one embodiment, device-based traffic management for Internet Protocol (IP)-based (e.g., Hypertext Transfer Protocol (HTTP)) can be performed. In one embodiment, security mechanisms for HTTP-based OTA can be provided. In one embodiment, network and/or device functionality may be managed remotely. In one embodiment, support for multiple HTTP-based OTA servers can be provided for securely provisioning one or more communication devices via OTA messaging.

In one embodiment, a device-based proxy can be utilized to provide traffic management for HTTP-based OTA messages. In one embodiment, a device-based proxy and a secure element (e.g., a Universal Integrated Circuit Card (UICC)) can be utilized to provide security for HTTP-based OTA messages, such as through authentication and/or encryption. In one embodiment, a Secure Device Processor (SDP) can be utilized as the device-based proxy. In one embodiment, remote management of the device and/or network components can be performed. In one embodiment, an administrative agent key function is provided that may be located in the UICC. In one embodiment, an administrative agent function is loaded into an SDP of a communication device, such as a mobile smart phone. In one embodiment, a remote management function can be provided in a remote management server in order to manage (in whole or in part) the administrative agent function, the administrative agent key function, and/or the transport keys that are distributed, such as to the SDP and/or OTA server(s).

In one or more embodiments, the secure element (e.g., executing the administrative agent key function), the secure device processor (e.g., executing the administrative agent function) and/or the device processor can be separate but in communication with each other. The secure element (e.g., UICC) can be a highly secure computing platform for storing secrets such as encryption keys and authentication credentials, and can host and execute applets. The SDP can be a processor that is logically and/or physically separate from the device processor (and/or the secure element), and can offer more security than the device processor, but not as much security as the secure element. Examples of an SDP include a Trusted Execution Environment (TEE) and an embedded Secure Element (eSE). In one or more embodiments, the administrative agent function of the SDP in conjunction with the OTA server can provide a secure means for delivering messages and response associated with OTA, including various programming data, to the secure element to enable the secure element to utilize the programming data (e.g., executing software updates, adjusting configuration settings or parameters and so forth).

Other embodiments are included in the subject disclosure.

One embodiment of the subject disclosure is a method including registering, by an administrative agent function operating in a secure device processor of a mobile communication device, an internet protocol address with an over-the-air programming server, where the internet protocol address is associated with the administrative agent function. The method can include receiving, from the over-the-air programming server by the administrative agent function, an over-the-air programming message that includes programming data for use by the mobile communication device, where the over-the-air programming message is encrypted by the over-the-air programming server, and where the over-the-air programming message utilizes a hypertext transfer protocol. The method can include decrypting, by the administrative agent function, the over-the-air programming message utilizing a first keyset to generate a decrypted over-the-air programming message. The method can include determining, by the administrative agent function, a schedule for providing messages to a secure element of the mobile communication device, where the secure device processor is separate from the secure element and in communication with the secure element. The method can include providing, by the administrative agent function, the decrypted over-the-air programming message to the secure element according to the schedule.

One embodiment of the subject disclosure is a method that includes receiving, by a server including a processor, a registration request including an internet protocol address, where the registration request is received from a secure device processor of a mobile communication device. The method can include encrypting, by the server, an over-the-air programming message utilizing a first keyset to generate an encrypted over-the-air programming message, where the over-the-air programming message includes programming data for use by the mobile communication device. The method can include providing, by the server, the encrypted over-the-air programming message to the secure device processor to enable the secure device processor to decrypt the encrypted over-the-air programming message utilizing the first keyset, where the providing of the encrypted over-the-air programming message further enables the secure device processor to provide the programming data to a secure element of the mobile communication device for provisioning of the mobile communication device, and wherein the secure device processor is separate from the secure element and in communication with the secure element.

One embodiment of the subject disclosure is a method that includes receiving, by a secure element of a mobile communication device, a request for a first keyset, where the request is received from a secure device processor of the mobile communication device, and where the secure element is separate from the secure device processor and in communication with the secure device processor. The method can include providing, by the secure element, the first keyset to the secure device processor to enable the secure device processor to decrypt an over-the-air programming message to generate a decrypted over-the-air programming message, where the over-the-air programming message includes programming data for provisioning the mobile communication device. The method can include receiving, by the secure element from the secure device processor, the decrypted over-the-air programming message. The method can include performing, by the secure element, an additional decryption of the decrypted over-the-air message utilizing a second keyset, where the secure device processor does not have access to the second keyset.

In accordance with an embodiment of the disclosure, FIG. 1 depicts a system 100 that includes a communication device 102 connected to or otherwise in communication with a network 122 and provided with a secure services platform 110 enabling authentication of other communication devices, encrypted communication with those devices, and/or secure communications related to OTA messages. Device 102 can be loaded with an administrative agent function (e.g., loaded into a secure device processor 106) and/or an administrative agent key function (e.g., loaded into a secure element 108) to enable or otherwise facilitate processing of messages and responses related to OTA, including messaging with a service provisioning system via one or more OTA servers.

It will be appreciated that the communication device 102 may be any device, including a user device, which has a secure element and a secure device processor. The term "user," in this example, refers to a human user of the communication device. However, in other embodiments, the user can be a machine that exchanges data with the communication device 102 after being authenticated to the communication device. Communication device 102 can include a device processor 104, the SDP 106 and the secure element 108 (e.g., which can include a UICC). The secure element 108 can be various types of smart cards including a Subscriber Identification Module (SIM) card or other types of secure element. The secure element 108 can be a secure computing platform and can offer a high level of security for storing encryption keys, authentication credentials, and the like. The secure element 108 may be removable from the device. In other embodiments, the secure element 108 may be embedded in the device and not removable. In other embodiments, the secure element 108 can be placed on a memory card or an embedded chip.

The SDP 106 can be logically and/or physically separate from the device processor 104, and can be connected to both the device processor and the secure element 108. In this embodiment, the SDP 106 can offer a higher level of security than the device processor 104, and can store and execute secure applications. The SDP 106 can, for example, run applications in a trusted execution environment. The secure element 108 and SDP 106 together can form a secure services platform 110 resident on the device 102. In this embodiment, secure element 108, SDP 106 and device processor 104 can each have a security level associated therewith, and the security level associated with the SDP 106 can be intermediate between that of the secure element 108 and that of the device processor 104. The SDP 106 and secure element 108 can use mutual authentication, as described in more detail below.

The secure element 108 and SDP 106 can communicate with a remote management (function) server 120, located remotely from device 102. The Remote Management Server (RMS) 120 can be a platform for provisioning and/or managing applications in the secure element 108 and SDP 106. The RMS 120 can also manage data (such as keys, credentials, and so forth) that are used by the applications. Examples of remote management servers are described in U.S. patent application Ser. No. 13/679,479 filed on Nov. 16, 2012 and U.S. patent application Ser. No. 13/680,680 filed on Nov. 19, 2012, the disclosures of both of which are hereby incorporated by reference.

In this embodiment, user device 102 can be a wireless communication device connected to a cellular network 122. Network 122 can also be other types of networks operating according to various communication protocols, such as a WiFi network. In other embodiments, device 102 can be connected to other devices via a wired connection through a computer. In still other embodiments, user devices can communicate with each other using Bluetooth, infrared communications (IRDa) and/or near field communications (NFC). A communication session between user devices, wherein information is transferred between the users, can be effected by a wide variety of arrangements. A secure application server (SAS) can be used in some embodiments to establish a secure communication session between devices. However, in some embodiments a secure application server may not be used where the communication session is established in a peer-to-peer manner, such as in Bluetooth, IRDa or NFC.

System 100 enables components of the secure services platform 110 (e.g., an administrative agent function of the SDP 106) to perform operations including one or more of registering an Internet Protocol (IP) address with the OTA server 150 where the IP address is associated with the administrative agent function; receiving, from the OTA server, an OTA message that includes programming data for use by the mobile communication device where the OTA message is encrypted by the OTA server and where the OTA message utilizes a hypertext transfer protocol; decrypting the OTA message utilizing a first keyset (e.g., a transport keyset) to generate a decrypted OTA message; determining a schedule for providing messages to a secure element of the mobile communication device where the SDP is separate from the secure element and in communication with the secure element; and providing the decrypted OTA message to the secure element according to the schedule.

System 100 enables components of the secure services platform 110 (e.g., the secure element 108) to perform operations including one or more of receiving a request for a first keyset (e.g., a transport keyset) where the request is received from an SDP of the mobile communication device and where the secure element is separate from the SDP and in communication with the SDP; providing the first keyset to the SDP to enable the SDP to decrypt an OTA message to generate a decrypted OTA message where the OTA message includes programming data for provisioning the mobile communication device; receiving the decrypted OTA message; and performing an additional decryption of the decrypted OTA message utilizing a second keyset where the SDP does not have access to the second keyset. In one embodiment, the secure element can receive a static key from the remote management server 120, where the remote management server provides the static key to the OTA 150 server that transmitted the OTA message to the SDP; and can generate the first keyset from the static key. In one embodiment, the secure element can include a UICC, wherein the OTA message utilizes HTTP, and where the receiving of the decrypted OTA message is according to a schedule generated by the SDP. In one embodiment, the secure element can generate a response to the OTA message; can encrypt the response utilizing the second keyset (e.g., application keyset) to generate an encrypted response; and can provide the encrypted response to the SDP for transmission to a service provisioning system 175 that originated the OTA message to enable the service provisioning system to decrypt the encrypted response utilizing the second keyset.

In one embodiment, the OTA server 150 can receive a registration request including an internet protocol address, where the registration request is received from SDP 106 of a mobile communication device. The OTA server 150 can encrypt an OTA message utilizing a first keyset to generate an encrypted OTA message, where the OTA message includes programming data for use by the mobile communication device. The OTA server 150 can provide the encrypted OTA message to the SDP 106 to enable the SDP to decrypt the encrypted OTA message utilizing the first keyset, where the providing of the encrypted OTA message further enables the SDP to provide the programming data to a secure element (e.g., UICC 108) of the mobile communication device for provisioning of the mobile communication device, and where the SDP is separate from the secure element and in communication with the secure element. In one embodiment, the OTA server 150 can receive the OTA message from the service provisioning system 175, where the OTA message is encrypted by the service provisioning system 175 utilizing a second keyset (e.g., application keyset), where the second keyset is accessible to the secure element and the service provisioning system, and where the second keyset is not accessible to the server and the secure device processor. In one embodiment, the providing of the encrypted OTA message to the SDP utilizes HTTP. In one embodiment, the OTA server 150 can receive a static key from the remote management server 120, where the remote management server provides the static key to the secure element to enable the secure element to generate, or otherwise derive, a key of the first keyset from the static key and to enable the secure element to provide the first keyset to the SDP. In one embodiment, the OTA server can generate another key of the first keyset from the static key. In one embodiment, the first keyset can be provided to the OTA server 150 and to the mobile communication device by the remote management server 120. In one embodiment, the OTA server 150 can receive the OTA message from the service provisioning system 175; can receive a request from the service provisioning system to provide the OTA message to another mobile communication device; can determine that another secure device processor of the other mobile communication device is not registered with the OTA server; and can provide a notice to the service provisioning system indicating that the other secure device processor is not registered with the server. In one embodiment, the OTA server 150 can receive a response to the OTA message; can decrypt the response utilizing the first keyset to generate a decrypted response; and can provide the decrypted response to the service provisioning system 175 that originated the OTA message. In one embodiment, the OTA server 150 can store the message for transmission later. In another embodiment, the OTA server 150 can retransmit the message, if necessary.

Figure 2:
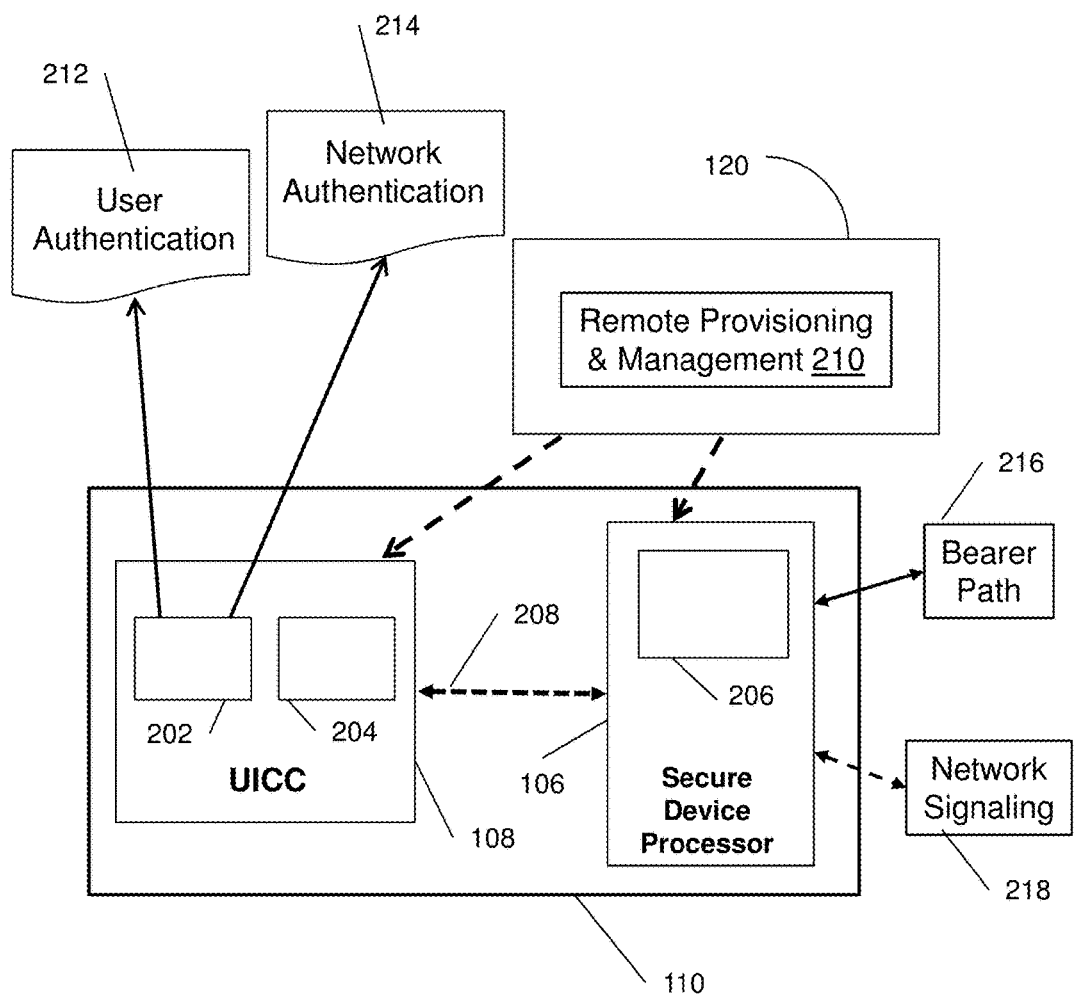
FIG. 2 depicts an illustrative embodiment of a system including the communication device of FIG. 1 implementing authentication and management functions, as well as provisioning functions.

FIG. 2 is a schematic illustration 200 showing details of a secure services platform 110, according to an embodiment of the disclosure, which can be used with the communication device 102 of FIG. 1. The secure element 108 can contain an authentication management function 202 and a real-time encryption key generator 204. The authentication management function 202 can provide authentication services for the device. For example, the authentication management function 202 can support mutual authentication of devices, support a mutual authentication of the device, such as with the RMS 120 of FIG. 1. As shown in FIG. 2, the authentication management function 202 can include a user authentication service 212 for authenticating the user to the device and a network authentication service 214 for authenticating the device to network equipment. The real-time encryption key generator 204 can supply encryption keys to a real-time encryption engine 206 which is located in the SDP 106. The real-time encryption engine 206 can encrypt and decrypt user information transmitted to or from a bearer path 216 that terminates at another device (e.g., another user device), and may encrypt and decrypt information transmitted on a signaling path 218 to the network. In another embodiment, the encryption engine can be loaded on a second secure element, separate from the secure element 108.

The RMS 120 can perform a remote provisioning and management function 210 to load applications, content and/or other information (e.g., various keysets) into the secure element 108 and/or SDP 106. In this embodiment, the RMS 120 can provision the authentication management function 202 and real-time encryption key generator 204 on the secure element 108, and can provision the real-time encryption engine 206 on the SDP 106. This can be done securely by the use of one or more remote management keysets. In one embodiment, before the secure services platform 110 can be used for communication, the SDP 106 can be authenticated by the secure element 108. In one embodiment, this can be done using a UICC-SDP keyset. The UICC-SDP keyset may be provisioned remotely by the RMS 120 or locally by an authorized user. In this embodiment, after the secure element 108 and SDP 106 are mutually authenticated using the UICC-SDP keyset, they can communicate via a signaling path 208 within the secure services platform 110. The UICC-SDP keyset may be used for secure communication during initial loading and provisioning. However, the keys being utilized may be different. In one embodiment, the path between the secure element 108 and the SDP 106 can go through the device processor 104 rather than directly between the secure element and the SDP.

In this embodiment of FIG. 2, the secure services platform 110 enables processing messages and responses related to OTA. These messages can be authenticated and/or encrypted utilizing various keysets that are exclusive to various devices or components so that the end points of the communication (e.g., the secure element and the service provisioning system) securely receive the programming data and/or the response related to the programming data. Various keysets can be distributed between pairs of devices or components, such as providing an SDP keyset to both of the administrative agent key function (of the secure element 108) and the administrative agent function (of the SDP 106), providing a transport keyset to both of the OTA server and the administrative agent function, and/or providing an application keyset to both the service provisioning system and the secure element. In one embodiment, the provisioning of one or more of these keysets can be performed by the remote management server, such as through use of remote management keysets.

Figures 3A, 3B:
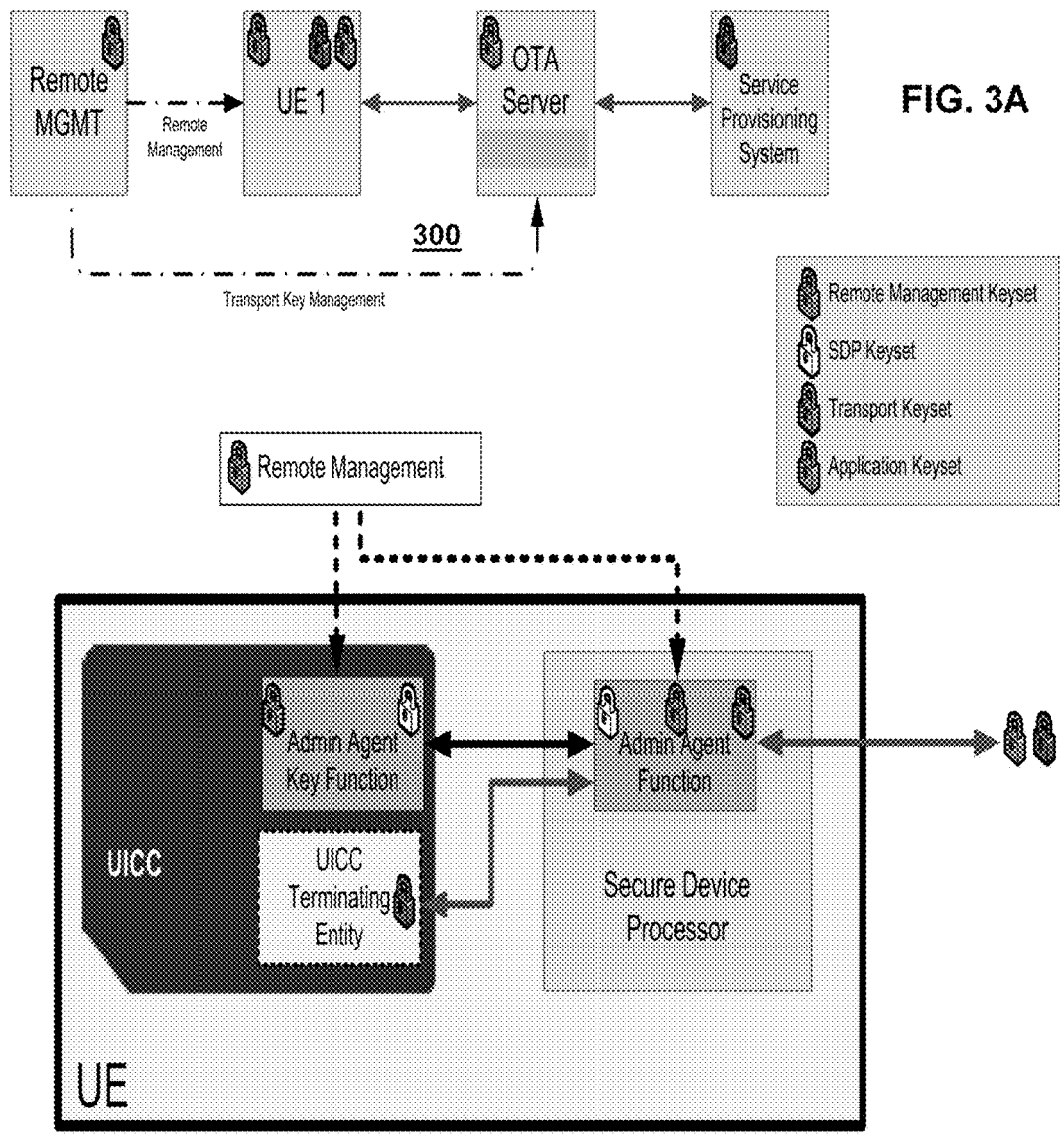
FIGS. 3A-3B depict an illustrative embodiment of a system that can be used for securely providing over-the-air programming of a communication device.

Referring to FIGS. 3A-B, a system 300 is depicted which illustrates a secure process for providing messages and responses related to OTA. System 300 can include managing HTTP-based OTA traffic from multiple sources to the secure element (e.g., UICC). In one embodiment, HTTP-based OTA messages can be sent from a service provisioning system to the secure element via a network-based OTA server and a device-based administrative agent function (e.g., operating in the secure device processor). The OTA server can prepare the message for OTA transport and may provide additional security, such as in the form of authentication and/or encryption. The administrative agent function, which can be located in or otherwise operated by the SDP, can receive HTTP-based OTA messages from one or more OTA servers, and can manage the delivery of the messages to the secure element, such as the UICC. The administrative agent function can also support additional security measures that were performed by the OTA server.

In one embodiment, the OTA server can perform transmitting and receiving messages to/from one or more service provisioning systems; transmitting and receiving messages to/from the UICC via the administrative agent function; and/or authenticating the administrative agent function and encrypting the OTA message.

In one embodiment, the SDP can contain or otherwise execute the administrative agent function. The SDP can be a processor that is logically and/or physically separate from the device processor and/or the secure element, and can offer more hardened security than the device processor, but not as much security as the UICC. The administrative agent function can perform one or more of transmitting and receiving messages to/from one or more OTA servers; providing transport security between itself and an OTA server; encrypting and decrypting messages using one or more transport keys; transmitting and receiving messages to/from the secure element; and managing the communication path to the secure element such as message queuing, scheduling (e.g., scheduling packets for transmission), response correlation (e.g., tracking and correlating responses for each transmission) and/or reliable delivery via retransmission. The SDP can also register an IP address (e.g., the IP address associated with the administrative agent function) with the OTA server.

In one embodiment, the secure element (e.g., the UICC) may contain or otherwise execute an administrative agent key function that can provide transport key(s), which are derived from a static key(s), to the administrative agent function. The secure element can perform security operations that were initiated by the service provisioning system, such as decryption based on application keysets. In one embodiment, multiple OTA servers can communicate with a single administrative agent function. In one embodiment, the transport key can be preloaded into the UICC (and/or the OTA server) or the transport key can be generated, or otherwise derived, from a static key (which in some embodiments can be derived from a master key).

In one embodiment, the remote management server can manage the applications on both the secure element and the SDP. For example, the remote management server can manage the download of static keys (for deriving the transport keys) and/or transport keys, as well as the status of existing transport keys. These transport keys may exist in either or both of the administrative agent key function and the administrative agent function. The remote management server can also provide a static key (for generating a transport key) and/or transport keys to other devices, such as the OTA server. These operations can be done securely by the use of one or more remote management keysets. These keysets can be used to mutually authenticate the secure element and SDP with the remote management server and/or to enable encryption between them. In one embodiment, the remote management server may use existing Short Message Service (SMS)-based OTA messaging to manage the secure element, including the administrative agent key function.

In one embodiment, the remote management server can be the source of the static key and/or may store the static key. In one embodiment, the remote management server can provide the static key to the secure element and to the OTA server. In one embodiment, the secure element and the OTA server can use the static key to generate or otherwise derive the transport key.

In another embodiment, the remote management server can provide a static keyset to the secure element and the OTA server. In one embodiment, the static keyset can be a master key or can be a static key that is derived from the master key. In one example, both the secure element and the OTA server can use the static key to derive the transport keys of the transport keyset. In one embodiment, the remote management server may store the static keyset. In another embodiment, a static key (e.g., derived from a master key by the remote management server) may be sent to the UICC and the OTA server, such as by the remote management server. The static key can be used to derive dynamic transport keys. In one embodiment, the UICC and the OTA server can be provided with the first keyset (e.g., transport keys), such as by the remote management server.

Figure 4A:
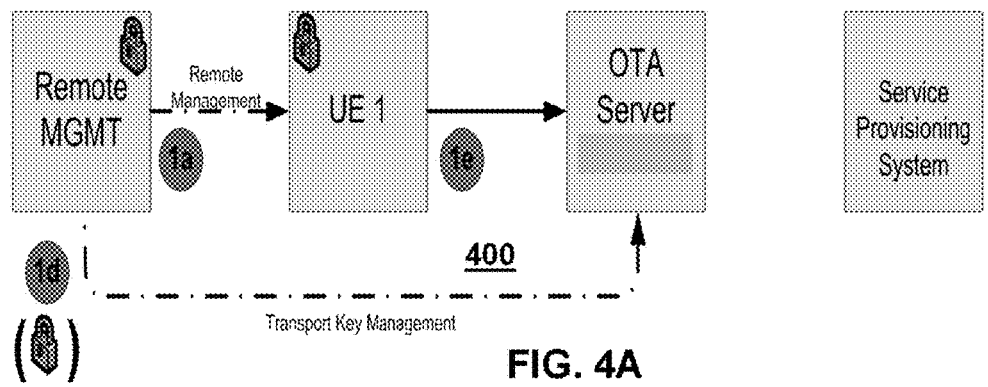
FIGS. 4A-4B depict an illustrative embodiment of a system that can be used for provisioning devices that are engaged in securely providing over-the-air programming of a communication device.
Figure 4B:
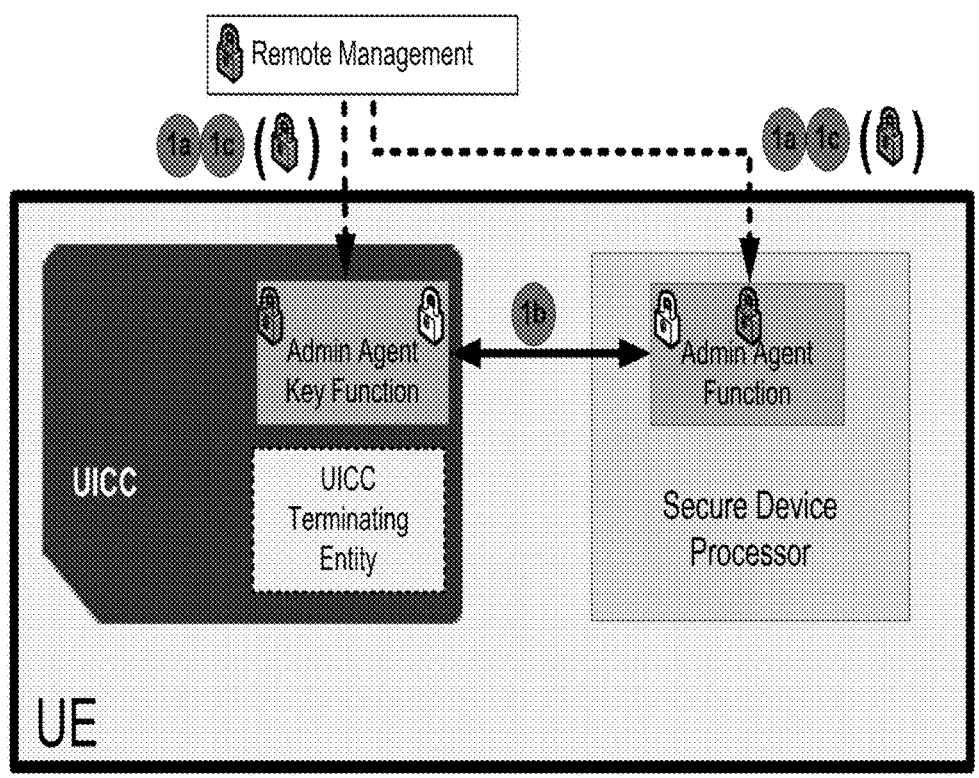

Referring to FIGS. 4A-B, system 400 is depicted which illustrates loading or otherwise provisioning the end user device(s) with the applications that are utilized by the secure services platform for performing the secure OTA messaging process. In one embodiment, there can be a plurality of applications to be loaded or otherwise provisioned, such as the administrative agent function and the administrative agent key function. For example, if the applications have not been loaded at the factory, then at 1a the remote management server can download the administrative agent function to the SDP and the administrative agent key function to the secure element. In one embodiment, remote management keysets can be used to securely transmit information from the remote management server to the UE(s). This process can utilize mutual authentication and/or encryption. In one embodiment, the remote management server may use SMS-based OTA to manage the secure element, including the download of the administrative agent key function.

At 1b, the administrative agent function and the administrative agent key function can mutually authenticate with each other, such as through utilizing an SDP keyset. The administrative agent function can verify that it is able to communicate with the administrative agent key function. At 1c, the remote management server can download one or more transport keys to the administrative agent key function and/or directly to the administrative agent function. This can be performed using a remote management keyset. As described above, the remote management server may use SMS-based OTA to manage the secure element, which may include the loading of the transport keys. In one embodiment, the remote management server may download the static key (which can be a master key or can be derived from a master key), or one or more transport keys to the administrative agent key function and/or directly to the administrative agent function. The static key can be used for deriving, by the remote management server, a key of the transport keys. At 1d, the remote management server can provide the transport key to one or more OTA servers. In one embodiment, the remote management server may download a static key (which can be a master key), or one or more transport keys to the OTA server. The static key can be used for deriving, by the OTA server, a key of the transport keys. At 1e, the administrative agent function can register its IP address with one or more OTA servers. This process can include mutual authentication and/or encryption using the transport keys.

Figure 5A:
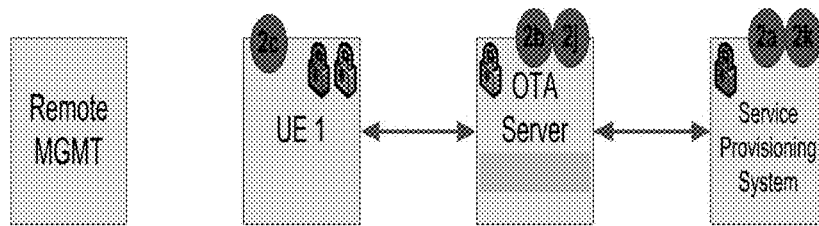
FIGS. 5A-5B depict an illustrative embodiment of a system that can be used for providing secure over-the-air programming of a communication device.
Figure 5B:
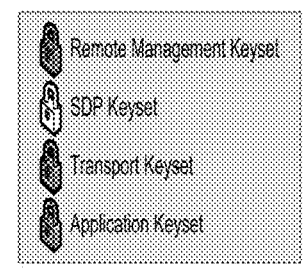
Figure 5B:
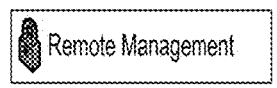
Figure 5B:
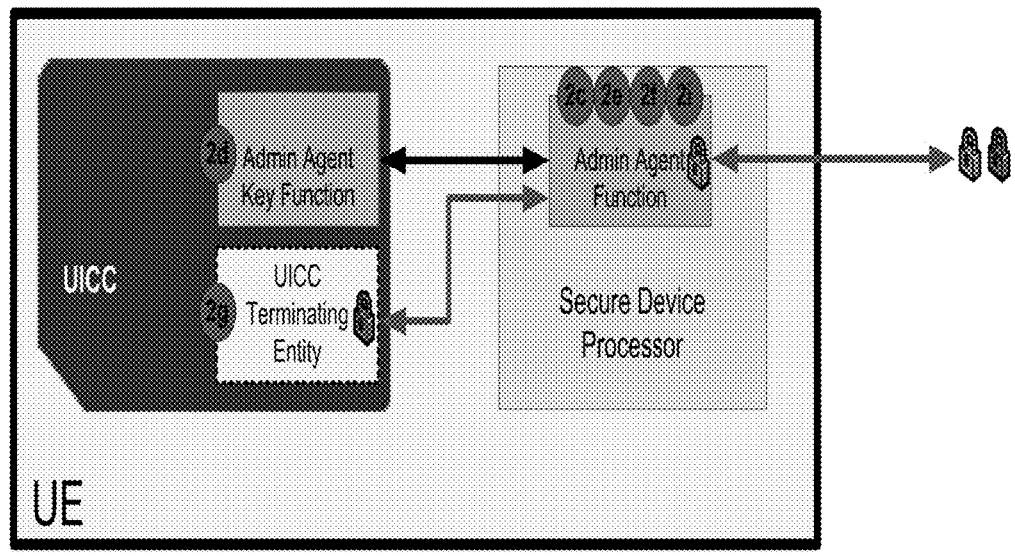

Referring to FIGS. 5A-B, system 500 is depicted which illustrates a process for securely communicating messages and responses related to OTA. The process is based on the OTA server forwarding an OTA message from a service provisioning system to the administrative agent function for transmission to the secure element. At 2a, a service provisioning system can prepare a message to be sent to the secure element. This message can be HTTP-based and may be encrypted using an application keyset. At 2b, the OTA server can receive the OTA message and can prepare to transmit the OTA message to the administrative agent function via HTTP. The OTA server may use a suitable transport key to authenticate the administrative agent function and encrypt the message. In one embodiment, if the administrative agent function has not registered with the OTA server, the OTA server can provide a suitable response back to the service provisioning system. In one embodiment, if the administrative agent function is not registered with the OTA server then the OTA server can store the OTA message for transmission at a later time, such as when the administrative agent function becomes registered. In one embodiment, periodic monitoring for registration can be performed.

At 2c, the administrative agent function can receive the message and can check to see if it is encrypted and authenticated with a transport key. If not, the administrative agent function can act upon the message as described in Step 2f. If so, the administrative agent function can determine whether or not it has the proper key to decrypt the message and can authenticate the OTA server. If it does then it can decrypt the message using its own transport key, can authenticate the OTA server, and can act upon the message as described in Step 2f.

At 2d, if the message is encrypted with a transport key and the administrative agent function does not have a corresponding transport key to decrypt it, the administrative agent function can ask the administrative agent key function to provide one. To do this, the administrative agent function can generate a request and can transmit the request to the administrative agent key function which can respond with a suitable transport key. In one embodiment, the key provided by the administrative agent key function can be derived from a static key stored by or otherwise accessible to the administrative agent key function. At 2e, the administrative agent function can decrypt the message using either its own transport key or one provided by the administrative agent key function. The administrative agent function can then authenticate the OTA server. At 2f, the administrative agent function can schedule the message for transmission to a UICC terminating entity (such as through generating a messaging schedule). Once the message is ready for transmission, the administrative agent function can schedule it for transmission, can transmit it at the scheduled time, can track the response from the secure element, and can retransmit if necessary.

At 2g, the UICC terminating entity can receive the message and can perform actions based on the content of the message, such as software update configuration setting adjustments, and so forth. If the message is encrypted with an application key, the UICC terminating entity can decrypt the message using its own application key. The UICC terminating entity may also respond to the message. At 2i, if a response is provided, then the response will travel back to the administrative agent function. The administrative agent function can correlate or otherwise map the response to the initial OTA message, encrypt the response with a transport key if desired, and transmit the response to the OTA server. At 2j, the OTA server can receive the response to the initial OTA message. In one embodiment, the OTA server can perform decryption utilizing the first keyset (e.g., a transport key). At 2k, the OTA server can transmit the response back to the service provisioning system. In one embodiment, the service provisioning system can perform decryption utilizing another keyset (e.g., an application key).

Figure 6:
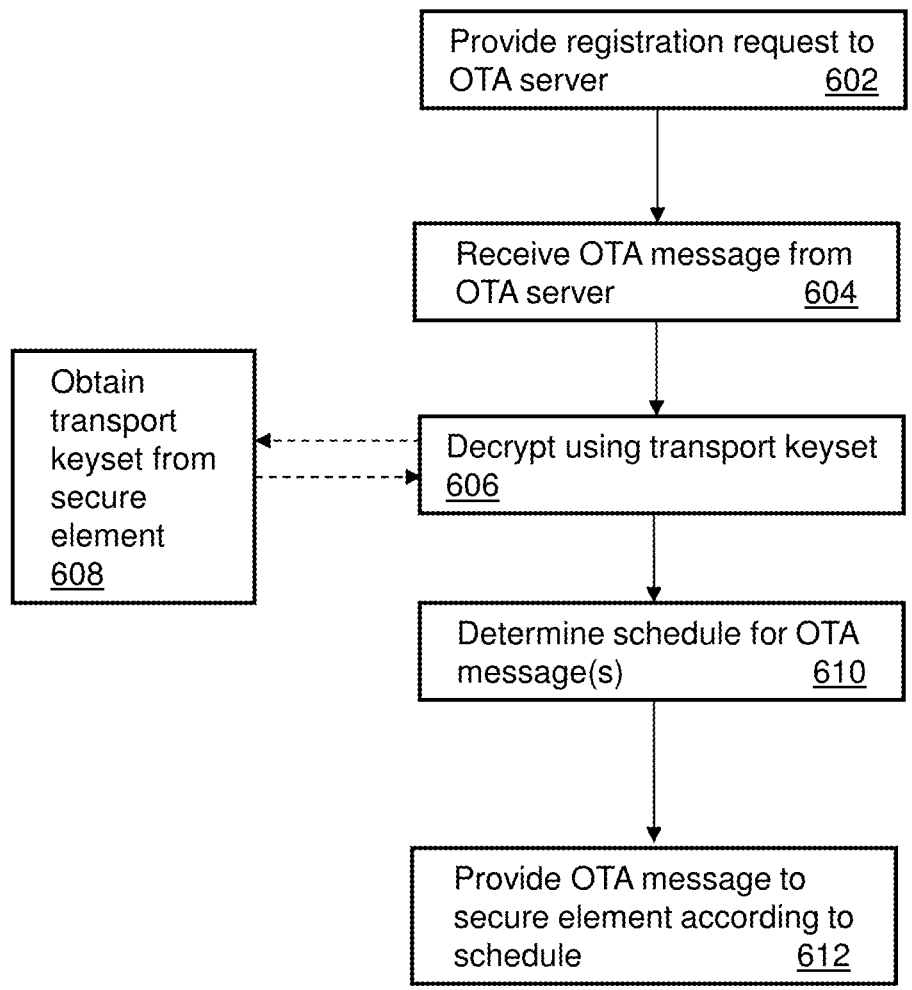
FIG. 6 depicts an illustrative embodiment of a method used in portions of the systems described in FIGS. 1-5B.

FIG. 6 depicts an illustrative embodiment of a method for providing secure over-the-air programming of a communication device. All or a portion of the steps of method 600 can be performed by various devices, including end user devices such as device 102 including secure services platform 110. More or less than the steps described in method 600 can be performed in one or more exemplary embodiments, and the order of steps can be rearranged. Method 600 can begin at 602 where a registration between a secure device processor (e.g., an administrative agent function) of a mobile communication device and an OTA server occurs. The registration can include the administrative agent function providing an internet protocol address to the OTA server, wherein the internet protocol address is associated with the administrative agent function. At 604, the administrative agent function can receive, from the OTA server, an OTA message. The OTA message can include programming data for use by the mobile communication device (e.g., usable by the secure element). In one embodiment, the OTA message can be encrypted by the OTA server. In another embodiment, the OTA message can utilize HTTP, although other transport protocols can also be used, such as SMS-based messaging. The programming data of the OTA message can be of various types including software updates, configuration settings, and/or other information that is utilized by the mobile communication device. The programming data can be over-the-air service provisioning (OTASP), over-the-air provisioning (OTAP) and/or over-the-air parameter administration (OTAPA).

At 606, the administrative agent function can detect an encryption of the OTA message and can decrypt it utilizing a first keyset (e.g., a transport keyset) to generate a decrypted OTA message. In one embodiment at 608, the administrative agent function can determine whether it has possession of the first keyset (e.g., stored in a memory of the secure device processor) and, if not, the administrative agent function can provide a keyset request to the secure element. In response to the request, the secure element (e.g., an administrative agent key function operating in a UICC) can provide the requested keyset (e.g., the transport keyset) to the administrative agent function. In one embodiment, the communication between the administrative agent function of the secure device processor and the administrative agent key function of the secure element can be based on a mutual authentication that utilizes SDP keyset provided to both the secure element and the secure device processor by the remote management server utilizing remote management keyset.

At 610, the administrative agent function can determine or otherwise generate a schedule for providing messages to the secure element of the mobile communication device. In this embodiment, the secure device processor is separate from the secure element and in communication with the secure element, as described in FIGS. 1 and 2. At 612, the administrative agent function can provide the decrypted OTA message to the secure element according to the schedule to enable the secure element (e.g., a UICC terminating entity operating in the secure element) to utilize the programming data of the OTA message, such as for provisioning of the mobile communication device (e.g., software updates, configuration setting adjustments, and so forth).

In one embodiment, the secure element can comprise a UICC. In one embodiment, the method 600 can further include one or more of monitoring, by the administrative agent function, for a response provided by the secure element; determining, by the administrative agent function, that the response is associated with the OTA message; encrypting, by the administrative agent function, the response utilizing the first keyset to generate an encrypted response; and providing, by the administrative agent function, the encrypted response to the OTA server to enable the OTA server to decrypt the encrypted response for transmission, such as to a service provisioning system that originated or is otherwise associated with the OTA message. In one embodiment, the providing of the decrypted OTA message to the secure element enables the secure element to further decrypt the decrypted OTA message utilizing a second keyset (e.g., an application keyset). In one embodiment, the application keyset can be stored by or otherwise accessible to the secure element and the service provisioning system. In another embodiment, the application keyset may not be accessible to the secure device processor. In another embodiment, the application keyset may not be accessible to the OTA server.

In one embodiment, method 600 can include authenticating, by the administrative agent function, with the secure element utilizing a third keyset (e.g., an SDP keyset). In one embodiment, the first keyset can be generated or otherwise derived by the secure element (e.g., the administrative agent key function) from a static key that is provided by a remote management server to the secure element and to the OTA server. In another embodiment, the providing of the static key to the secure element by the remote management server can be based on another OTA message that utilizes SMS transport protocol (e.g., SMPP). In one embodiment the static key can be a master key or can be derived from a master key.

In one embodiment, method 600 can include receiving, by the administrative agent function, the first keyset (e.g., transport keyset) from a remote management server, where the remote management server provides the first keyset to the OTA server, and where the receiving of the first keyset by the administrative agent function is performed utilizing a remote management keyset.

In one embodiment, the administrative agent function can be downloaded to the secure device processor utilizing the remote management keyset. In one embodiment, the administrative agent key function can be downloaded to the secure element utilizing the remote management keyset.

In one embodiment, the OTA message can originate from a service provisioning system, where the providing of the decrypted OTA message to the secure element enables the secure element to further decrypt the decrypted OTA message utilizing a second keyset (e.g., application keyset), where the administrative agent function and the OTA server do not have access to the second keyset, and wherein the service provisioning system has access to the second keyset.

In one embodiment, the method 600 can include one or more of determining, by the administrative agent function, that a response has been generated by the secure element and is associated with the OTA message; and providing, by the administrative agent function, the response to the OTA server for transmission to the service provisioning system. In one embodiment, the response can be encrypted by the secure element utilizing the second keyset (e.g., application keyset), where the response is configured for decryption by the service provisioning system utilizing the second keyset.

In one embodiment, method 600 can include providing, by the administrative agent function, a request to the secure element for the first keyset responsive to a determination that the OTA message has been encrypted; and receiving, by the administrative agent function, the first keyset from the secure element. In another embodiment, the static key can be provided to the secure element (e.g., the administrative agent key function) and the OTA server for deriving of the transport keys, respectively, of the transport keyset. In one embodiment, method 600 can include retransmitting, by the administrative agent function, the decrypted OTA message to the secure element.

Figure 7:
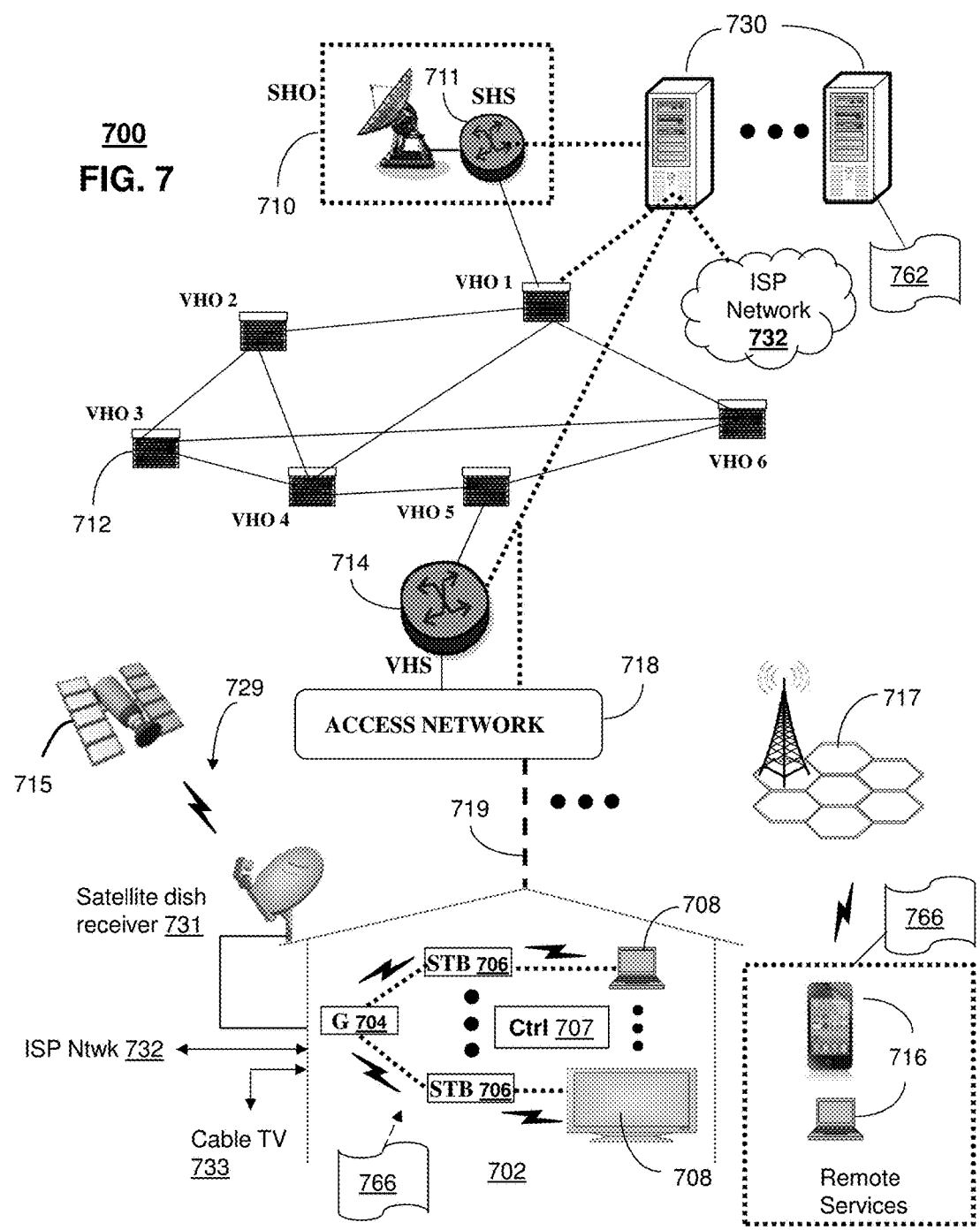
FIG. 7 depicts an illustrative embodiment of a communication system that provides media services including secure communication of over-the-air programming for a communication device.

FIG. 7 depicts an illustrative embodiment of a communication system 700 for delivering media content. The communication system 700 can represent an Internet Protocol Television (IPTV) media system. Communication system 700 can be overlaid or operably coupled with systems 100, 200 of FIGS. 1 and 2 as another representative embodiment of communication system 700. In one or more embodiments, system 700 enables utilizing both the secure element and SDP together to provide a secure platform for delivering messages and responses related to OTA. System 700 can enable registering an IP address with an OTA server; receiving, from the OTA server, an OTA message that includes programming data for use by the mobile communication device, where the OTA message is encrypted by the OTA server and utilizes HTTP; decrypting the OTA message utilizing a first keyset to generate a decrypted OTA message; determining a schedule for providing messages to a secure element of the mobile communication device; and providing the decrypted OTA message to the secure element according to the schedule.

In one or more embodiments, system 700 enables authentication and/or encryption to be performed between various devices (or components of a single device) based on keysets distributed between pairs of devices or components, such as providing an SDP keyset to both of the secure element and the SDP, providing a transport keyset to both of the SDP and the OTA server, and/or providing an application keyset to both the secure element and the service provisioning system. The distribution of these keysets can be exclusive between the pairs of devices or components or can be non-exclusive.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for computing devices 730 to function as a remote management server, an OTA server and/or a service provisioning system (herein referred to as server 730). The server 730 can use computing and communication technology to perform function 762, which can include among other things, provisioning various devices or components, such as through use of remote management keysets. The provisioning can be of applications, such as the administrative agent function and/or the administrative agent key function, and/or can be of keysets, such as transport keysets. Function 762 can include one or more of receiving a registration request including an IP address, where the registration request is received from a secure device processor of a mobile communication device; encrypting an OTA message utilizing a first keyset to generate an encrypted OTA message, where the OTA message includes programming data for use by the mobile communication device; and providing the encrypted OTA message to the secure device processor to enable the secure device processor to decrypt the encrypted OTA message utilizing the first keyset. In one embodiment, the providing of the encrypted OTA message can further enable the secure device processor to provide the programming data to a secure element of the mobile communication device for provisioning of the mobile communication device. In another embodiment, the secure device processor can be separate from the secure element and in communication with the secure element.

Function 766 can include functions being performed at the secure element 108 including one or more of receiving a request for a first keyset, where the request is received from a secure device processor of the mobile communication device, and where the secure element is separate from the secure device processor and in communication with the secure device processor; providing the first keyset to the secure device processor to enable the secure device processor to decrypt an OTA message to generate a decrypted OTA message where the OTA message includes programming data for provisioning the mobile communication device; receiving, from the secure device processor, the decrypted OTA message; and performing an additional decryption of the decrypted OTA message utilizing a second keyset. In one embodiment, the secure device processor does not have access to the second keyset.

Function 766 can also include functions being performed at the SDP 106 such as one or more of registering an IP address with an OTA server, where the IP address is associated with the administrative agent function; receiving, from the OTA server, an OTA message that includes programming data for use by the mobile communication device, where the OTA message is encrypted by the OTA server, where the OTA message utilizes HTTP; decrypting the OTA message utilizing a first keyset (e.g., transport keyset) to generate a decrypted OTA message; determining a schedule for providing messages to a secure element of the mobile communication device where the secure device processor is separate from the secure element and in communication with the secure element; and providing the decrypted OTA message to the secure element according to the schedule.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
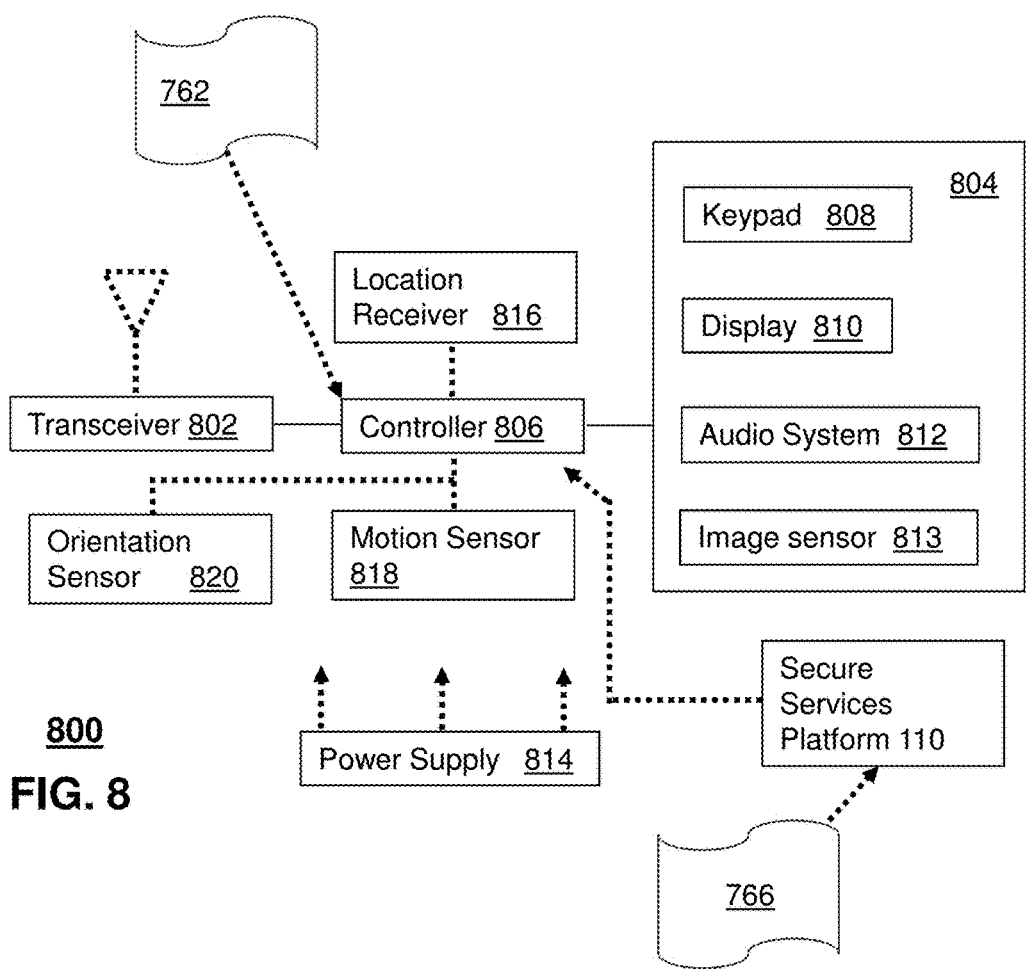
FIG. 8 depicts an illustrative embodiment of a communication device that can securely communicate messages and responses related to over-the-air programming.

FIG. 8 depicts an illustrative embodiment of a communication device 800. Communication device 800 can serve in whole or in part as an illustrative embodiment of the devices depicted in FIGS. 1-5 and 7. For instance, device 800 can include a secure element (e.g., executing an administrative agent key function) and a secure device processor (executing an administrative agent function) in the secure services platform 110 which perform the functions described in the exemplary embodiments herein.

In one or more embodiments, the secure element of device 800 can perform operations including generating transport keys from a static key and providing the transport key to the SDP so that the SDP can authenticate, encrypt and/or decrypt in conjunction to messages/responses of the OTA server. The secure element can also decrypt OTA messages originated from the service provisioning system; generate and encrypt responses to the OTA message that are to be transmitted (by the SDP) to the service provisioning system; and/or utilize programming data included in the OTA message (e.g., updating software, adjusting device settings, and so forth). In other embodiments, static keys can be selectively distributed to enable deriving the transport keyset.

In one or more embodiments, the SDP (e.g., the administrative agent function) of device 800 can perform operations including authenticate, encrypt and/or decrypt in conjunction to messages/responses of the OTA server; request transport keys from the secure element; schedule transmissions of OTA messages to the secure element; and/or retransmit OTA messages to the secure element.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, NFC, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. In one embodiment, the communication device 800 can also include a slot for adding or removing the UICC.

The communication device 800 as described herein can operate with more or less of the circuit components shown in FIG. 8. These variant embodiments can be used in one or more embodiments of the subject disclosure.

The communication device 800 can be adapted to perform the functions of the media processor 706, the media devices 708, the portable communication devices 716 and/or the server 730 of FIG. 7. It will be appreciated that the communication device 800 can also represent other devices that can operate in communication system 700 of FIG. 7, such as a gaming console and a media player.

The communication device 800 shown in FIG. 8 or portions thereof can serve as a representation of one or more of the devices of FIGS. 1-5 and 7 including end user devices, customer premises equipment, remote management servers, OTA servers and/or service provisioning system. In one or more embodiments, the OTA server 150 and/or the service provisioning system can be operated by, or otherwise affiliated with, a third party entity that is different from and/or independent of the service provider operating the RMS 120. In addition, the controller 806 can perform the functions 762 and/or 766.

Upon reviewing the aforementioned embodiments, it would be evident to an artisan with ordinary skill in the art that said embodiments can be modified, reduced, or enhanced without departing from the scope of the claims described below. For example, in the event that a secure element and/or SDP is determined to be inaccessible (such as via an HTTP message) from the OTA server, an alert can be generated to implement techniques for delivering of the OTA message as described in the U.S. patent application entitled "Apparatus and Method for Secure Over The Air Programming of a Communication Device" with Ser. No. 14/069,908, the disclosure of which is hereby incorporated by reference. For instance, the alert can be transmitted to the mobile device to indicate that OTA programming data is available. In another embodiment, the alert can cause a network interworking function or another network element to determine if there are other alternate delivery techniques available for the secure element.

In one embodiment, encryption can be applied by the service provisioning system to the OTA message or by the secure element to the response based on various encryption techniques including elliptical curve cryptography, Advance Encryption Standard (AES), and so forth. Other encryption techniques can be utilized, including symmetrical and/or asymmetrical cryptographic methods. In another embodiment, the mobile communication device can communicate with the service provisioning system (or another device) via the administrative agent function to transfer various information (e.g., in a secure message), which may or may not be related to the OTA message. This information can be provided with the various security procedures described above with respect to one or more of the exemplary embodiments, including encrypting with application keyset (e.g., done at the secure element), encrypting with transport keyset (e.g., done at an application agent function of the mobile communication device), and/or authentication between various devices and/or components (e.g., authentication between the secure element and the administrative agent function, authentication between the OTA server and the administrative agent function, and so forth).

As an example, the secure element can generate a secure message for transmission; encrypt the secure message utilizing the second keyset (e.g., application keyset) to generate an encrypted secure message; and provide the encrypted secure message to the secure device processor for transmission to a destination device via an intermediate server (e.g., OTA server) to enable the destination device to decrypt the encrypted secure message utilizing the second keyset, where the encrypted secure message is further encrypted by the secure device processor utilizing the first keyset (e.g., transport keyset), and where the encrypted secure message is further decrypted by the intermediate server utilizing the first keyset prior to delivery to the intermediate server. In one embodiment, the OTA server can re-encrypt a message that the OTA server received from a device before transmitting to another device. In one embodiment, the OTA server can be an OTA server function, the remote management server can be a remote management server function, and both the OTA server function and the remote management server function can operate from a single device or from a group of devices (where each device of the group executes both functions). In another embodiment, the OTA server and the remote management server are separate devices. In one embodiment, each transport key of the transport keyset can be static or dynamic.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
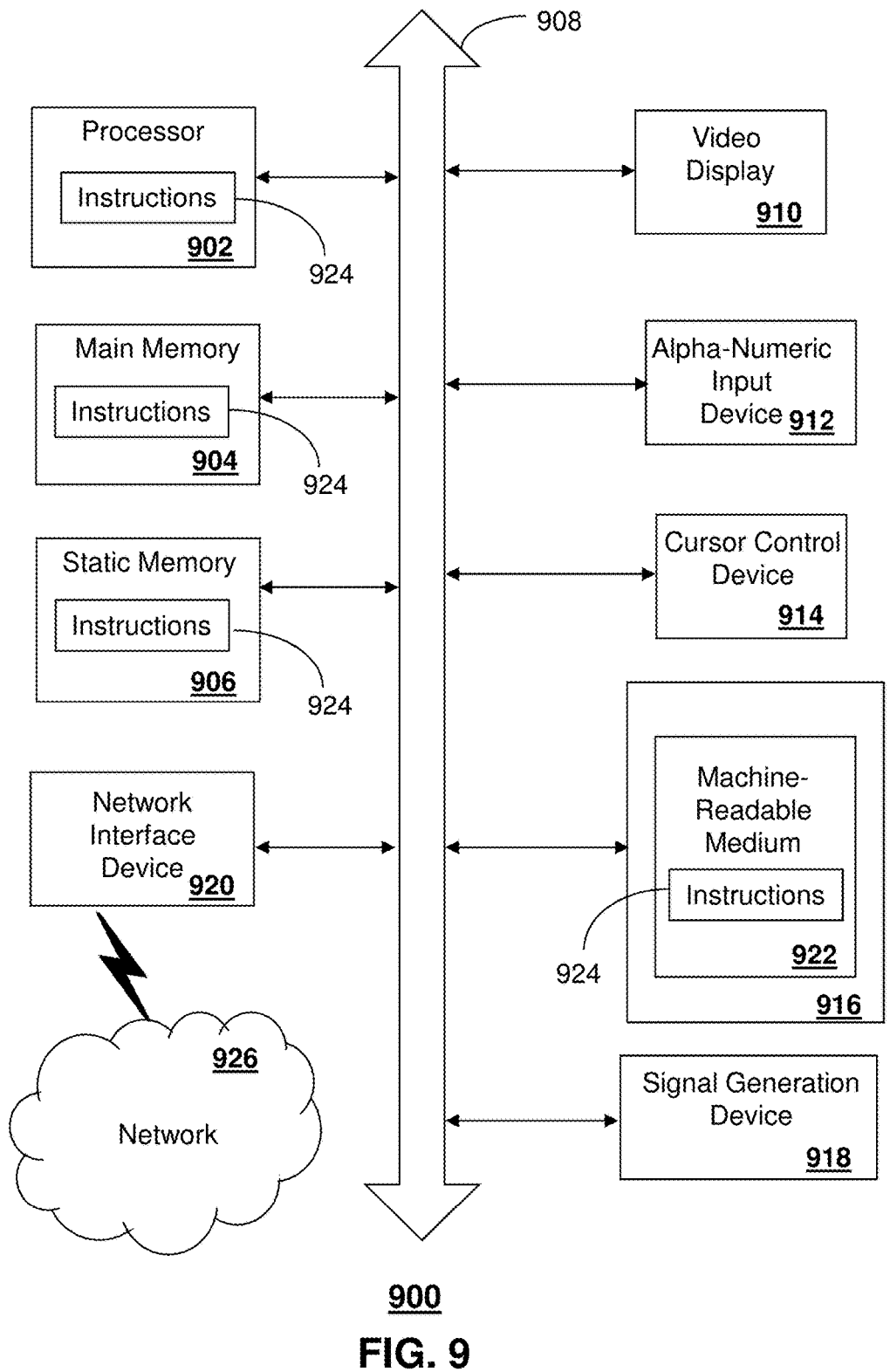
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the remote management server, the service provisioning system, the OTA server, the secure services platform (e.g., the secure element and/or the administrative agent function of the SDP), the device processor, and so forth. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "separate" can include a component or device that is logically and/or physically separate from another component or device, which can include components/devices that operate independently of each other while being in communication with each other. In one or more embodiments, devices can be separate in that they do not share any common component (although such separate devices can be in communication with each other such as via an electrode coupling. In one or more embodiments, devices can be separate in that they each have one or more components that are not shared between each other but have one or more components that may be shared with each other.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, NFC) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee, NFC), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, by a secure device processor of a communication device, an over-the-air programming message that includes programming data for use by the communication device, wherein the over-the-air programming message is received from and encrypted by an over-the-air programming server;
    receiving, by the secure device processor, a first keyset from a remote management server, wherein the remote management server provides the first keyset to the over-the-air programming server, and wherein the receiving of the first keyset by the secure device processor is performed utilizing a remote management keyset;
    decrypting, by the secure device processor, the over-the-air programming message utilizing the first keyset to generate a decrypted over-the-air programming message;
    determining, by the secure device processor, a schedule for providing messages to a secure element of the communication device, wherein the secure device processor is separate from the secure element and in communication with the secure element; and
    providing, by the secure device processor, the decrypted over-the-air programming message to the secure element according to the schedule, wherein the providing of the decrypted over-the-air programming message to the secure element enables the secure element to further decrypt the decrypted over-the-air programming message utilizing a second keyset, and wherein the secure device processor does not have access to the second keyset.

2. The method of claim 1, wherein the over-the-air programming message originates from a service provisioning system, wherein the over-the-air programming server does not have access to the second keyset, and wherein the service provisioning system has access to the second keyset.

3. The method of claim 2, comprising:
    determining, by the secure device processor, that a response has been generated by the secure element and is associated with the over-the-air programming message; and
    providing, by the secure device processor, the response to the over-the-air programming server for transmission to the service provisioning system, wherein the response is encrypted by the secure element utilizing the second keyset, and wherein the response is configured for decryption by the service provisioning system utilizing the second keyset.

4. The method of claim 1, further comprising:
    monitoring, by the secure device processor, for a response provided by the secure element;
    determining, by the secure device processor, that the response is associated with the over-the-air programming message;
    encrypting, by the secure device processor, the response utilizing the first keyset to generate an encrypted response; and

23 providing, by the secure device processor, the encrypted response to the over-the-air programming server to enable the over-the-air programming server to decrypt the encrypted response for transmission to a service provisioning system.

5. The method of claim 4, further comprising:
authenticating, by the secure device processor, with the secure element utilizing a third keyset; and
receiving, by the secure device processor, the first keyset from the secure element,
wherein the first keyset is generated by the secure element from a static key that is provided by the remote management server to the secure element and to the over-the-air programming server.

6. The method of claim 5, wherein the providing of the static key to the secure element by the remote management server is based on another over-the-air programming message that utilizes short message service transport protocol.

7. The method of claim 1, comprising:
providing, by the secure device processor, a request to the secure element for the first keyset responsive to a determination that the over-the-air programming message has been encrypted; and
receiving, by the secure device processor, the first keyset from the secure element.

8. The method of claim 1, comprising retransmitting, by the secure device processor, the decrypted over-the-air programming message to the secure element.

9. A method comprising:
receiving, by a server including a processor, a static key from a remote management server, wherein the remote management server provides the static key to a secure element of a communication device to enable the secure element to generate a first keyset from the static key and to enable the secure element to provide the first keyset to a secure device processor of the communication device;
generating, by the server, the first keyset from the static key;
encrypting, by the server, an over-the-air programming message utilizing the first keyset to generate an encrypted over-the-air programming message, wherein the over-the-air programming message includes programming data for use by the communication device; and
providing, by the server, the encrypted over-the-air programming message to the secure device processor of the communication device to enable the secure device processor to decrypt the encrypted over-the-air programming message utilizing the first keyset, wherein the providing of the encrypted over-the-air programming message further enables the secure device processor to provide the programming data to the secure element of the communication device according to a schedule for provisioning of the communication device, wherein the schedule is determined by the secure device processor, and wherein the secure device processor is separate from the secure element and in communication with the secure element, wherein the providing of the programming data to the secure element enables the secure element to further decrypt the programming data utilizing a second keyset, and wherein the secure device processor does not have access to the second keyset.

10. The method of claim 9, comprising receiving, by the server, the over-the-air programming message from a service provisioning system, wherein the over-the-air programming message is encrypted by the service provisioning system utilizing a second keyset.

11. The method of claim 9, wherein the providing of the encrypted over-the-air programming message to the secure device processor utilizes a hypertext transfer protocol.

12. The method of claim 9, comprising:
receiving, by the server, the over-the-air programming message from a service provisioning system;
receiving, by the server, a request from the service provisioning system to provide the over-the-air programming message to a second communication device;
determining, by the server, that the second communication device is not registered with the server; and
providing, by the server, a notice to the service provisioning system indicating that a second secure device processor of the second communication device is not registered with the server.

13. The method of claim 9, comprising:
receiving, by the server, a response to the over-the-air programming message;
decrypting, by the server, the response utilizing the first keyset to generate a decrypted response; and
providing, by the server, the decrypted response to a service provisioning system that originated the over-the-air programming message.

14. A communication device comprising:
a secure element having a secure element memory with first executable instructions, wherein the secure element, responsive to executing the first executable instructions, performs first operations comprising:
receiving a request for a first keyset, wherein the request is received from a secure device processor of the communication device;
providing the first keyset to the secure device processor;
receiving, from the secure device processor, a decrypted over-the-air programming message according to a schedule for providing messages; and
performing an additional decryption of the decrypted over-the-air programming message utilizing a second keyset, wherein the secure device processor does not have access to the second keyset; and
the secure device processor having a secure device processor memory with second executable instructions, wherein the secure device processor, responsive to executing the second executable instructions, performs second operations comprising:
determining the schedule for provision of the messages to the secure element;
decrypting an over-the-air programming message utilizing the first keyset to generate the decrypted over-the-air programming message, wherein the over-the-air programming message includes programming data for provisioning the communication device,
wherein the secure device processor is separate from the secure element and in communication with the secure element; and
a device processor that facilitates wireless communications of the communication device, wherein the device processor is separate from the secure device processor and the secure element.

15. The communication device of claim 14, wherein the first operations further comprise:
receiving a static key from a remote management server, wherein the remote management server provides the static key to an over-the-air programming server that transmitted the over-the-air programming message to the secure device processor; and generating the first keyset from the static key.

16. The communication device of claim 14, wherein the secure element comprises a universal integrated circuit card, wherein the over-the-air programming message utilizes a hypertext transfer protocol, and wherein the receiving of the decrypted over-the-air programming message is according to a schedule generated by the secure device processor.

17. The communication device of claim 14, wherein the first operations further comprise:

generating a secure message for transmission;

encrypting the secure message utilizing the second keyset to generate an encrypted secure message; and providing the encrypted secure message to the secure device processor for transmission to a destination device via an intermediate server to enable the destination device to decrypt the encrypted secure message utilizing the second keyset, wherein the encrypted secure message is further encrypted by the secure device processor utilizing the first keyset, and wherein the encrypted secure message is further decrypted by the intermediate server utilizing the first keyset prior to delivery to the intermediate server.

* * * * *